US006650244B1

(12) United States Patent
Chen et al.

(10) Patent No.: US 6,650,244 B1
(45) Date of Patent: Nov. 18, 2003

(54) ON-VEHICLE FLOOD ALARM SYSTEM

(75) Inventors: Kuo-Rong Chen, Panchiao (TW); Chun-Chung Lee, Taipei (TW); Cheng-Hung Huang, Miaoli Hsien (TW)

(73) Assignee: Sin Etke Technology Co., Ltd., Taipei (TW)

(*) Notice: Subject to any disclaimer, the term of this patent is extended or adjusted under 35 U.S.C. 154(b) by 0 days.

(21) Appl. No.: 10/200,119

(22) Filed: Jul. 23, 2002

(30) Foreign Application Priority Data

May 30, 2002 (TW) ........................................ 91207921 U

(51) Int. Cl.7 .......................... G08B 21/00; B60Q 1/22; B60Q 1/00

(52) U.S. Cl. ....................... 340/618; 340/603; 340/605; 340/425.5; 340/438; 340/463

(58) Field of Search ................................ 340/618, 463, 340/621, 603, 605, 612, 619–623, 425.5, 438; 379/37–51

(56) References Cited

U.S. PATENT DOCUMENTS 5,097,250 A * 3/1992 Hernandez .................. 340/438
5,515,025 A * 5/1996 Barrows ..................... 340/431
5,850,175 A * 12/1998 Yeilding ..................... 340/431

* cited by examiner

*Primary Examiner*—Jeffery Hofsass
*Assistant Examiner*—Lam Pham
(74) *Attorney, Agent, or Firm*—Bacon & Thomas PLLC

(57) ABSTRACT

An on-vehicle flood alarm system is disclosed to install a water level sensor in the bottom side of the floor of the motor vehicle, which water level sensor works when the motor vehicle's ignition switch turned off, and sends a control signal to a microprocessor when the distance between the water level sensor and the level of water accumulated on the ground became shorter than a predetermined distance, which microprocessor drives a GSM communication device to give a flood alarm short message to the owner of the motor vehicle when continuously received the control signal ten times within two minutes. By means of the aforesaid performance, the on-vehicle flood alarm system informs the owner of the motor vehicle to take the necessary action at an early stage, preventing soaking of the motor vehicle in water and reducing the cost of repairing.

7 Claims, 3 Drawing Sheets

ON-VEHICLE FLOOD ALARM SYSTEM

BACKGROUND OF THE INVENTION

1. Field of the Invention

The present invention relates to an alarm system and, more particularly, to an on-vehicle flood alarm system, which automatically gives a flood alarm signal to the owner of the motor vehicle, informing the owner of the motor vehicle to take the necessary action before late.

2. Description of Related Art

In recent years, due to excessive exploitation of the earth, the atmospheric environment has been greatly changed, flood and drought news are frequently heard, and the living land of human beings has been gradually and unexpectedly damaged. For example, when a flood occurred and covered over the parking area (a parking lot or the side of a road) due to a sudden heavy rain after the motor vehicle owner went away from the motor vehicle, the motor vehicle owner may be unable to rescue the motor vehicle before late. Therefore the owner may cost a lot to repair the motor vehicle. Even more, the motor vehicle may become useless when soaked in the flood.

Therefore, it is desirable to provide an on-vehicle flood alarm system that eliminates the aforesaid problem.

SUMMARY OF THE INVENTION

It is the main object of the present invention to provide an on-vehicle flood alarm system that automatically gives an alarm signal to the owner of the motor vehicle when a flood going to happen, informing the owner to take the necessary action in advance.

It is another object of the present invention to provide an on-vehicle flood alarm system that could prevent soaking of the motor vehicle and reducing the cost of repairing.

To achieve these and other objects of the present invention, the on-vehicle flood alarm system comprises at least one water level sensor, an alarm device, and a microprocessor. The water level sensor is provided at the bottom side of the floor of the motor vehicle and spaced above the ground at a distance, and adapted to detect accumulation water on the ground when the ignition switch of the motor vehicle turned off. The water level sensor sends out a control signal when the distance between the level of accumulated water on the ground and the respective water level sensor became shorter than a predetermined distance. The microprocessor is electrically connected to the water level sensor and the alarm device, and adapted to receive the control signal from the water level sensor and to further drive the alarm device to send out an alarm signal, informing the owner of the motor vehicle to take the necessary action. By means of the aforesaid performance, the on-vehicle flood alarm system informs the owner of the motor vehicle to take the necessary action at an early stage, preventing soaking of the motor vehicle in water and reducing the cost of repairing.

The water level sensor can be an electric field induction type water level sensor that detects surrounding electric intensity. Ultrasonic sensor or any of a variety of other equivalent sensors capable of detecting its distance from the level of water accumulated on the ground may be used as a substitute.

According to one embodiment of the present invention, only one water level sensor is used and installed in the center of the bottom side of the floor of the motor vehicle. This embodiment could reduce the cost and ensure the correctness of the detected data. According to another embodiment of the present invention, two water level sensors are used and respectively installed in the bottom side of the front bumper and the bottom side of the rear bumper. Alternatively, more than three water level sensors may be used and equally spaced in the bottom side of the floor of the motor vehicle.

When multiple water level sensors are used, the microprocessor calculates the data obtained from the water level sensors through Boolean Operator and then makes a logic judgment. This data calculation and logic judgment procedure may be variously performed subject to different requirements. Because this data calculation and logic judgment procedure is of the known art and not within the scope of the claims of the present invention, no further detailed description is necessary in this regard.

The alarm device can be a siren, a regular burglar alarm, a flash alarm, or any of a variety of audio and/or visual alarm devices. Preferably, the alarm device is a wireless communication device that automatically gives a wireless alarm signal to inform the owner of the motor vehicle.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
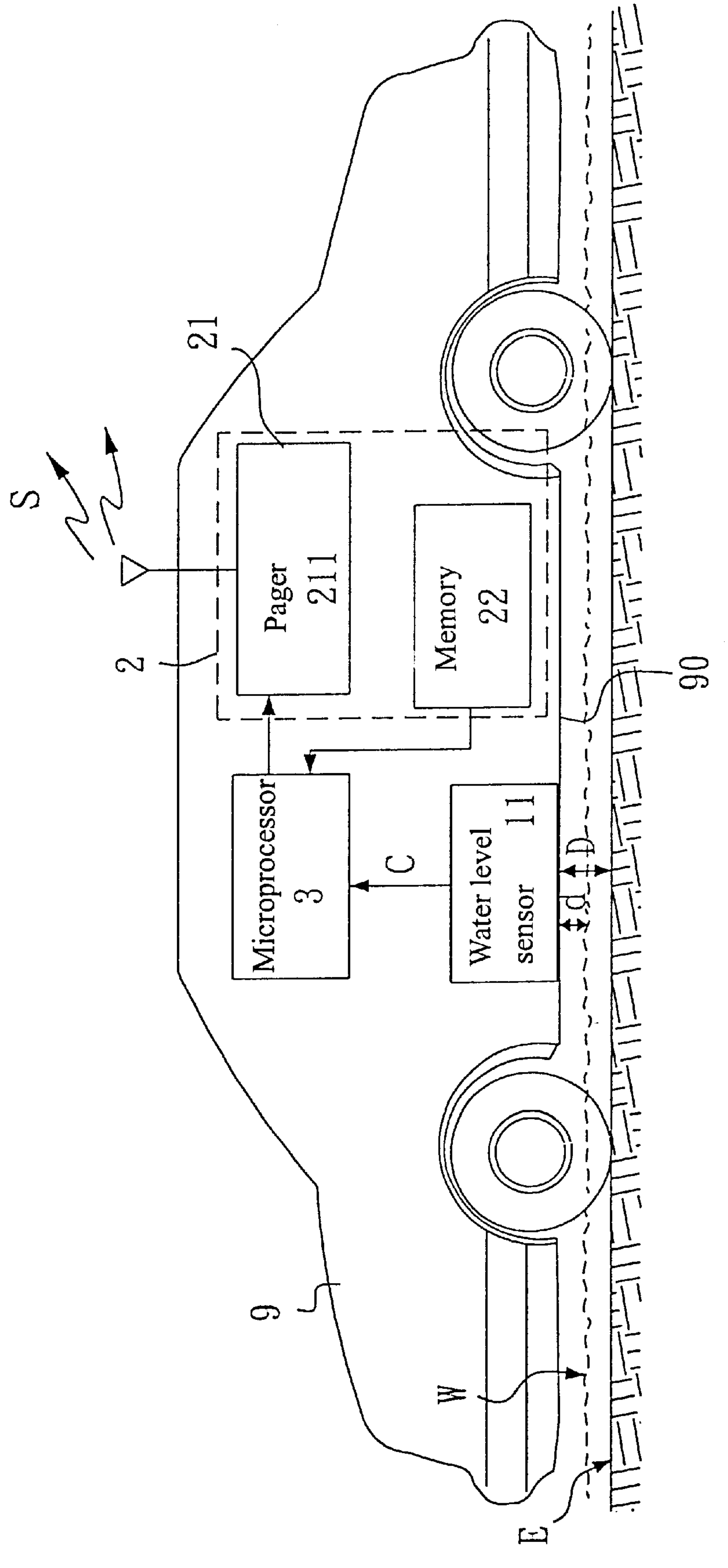
FIG. 1 is a functional block diagram of an on-vehicle flood alarm system according to the first embodiment of the present invention.

Referring to FIG. 1, an on-vehicle flood alarm system in accordance with the present invention is shown comprising a water level sensor 11, an alarm device 2, and a microprocessor 3 connected to the water level sensor 11 and the alarm device 2. The water level sensor 11 is installed near the center of the bottom side of the floor 90 of the motor vehicle 9, and spaced above the ground E at an applicable distance D.

Figure 2:
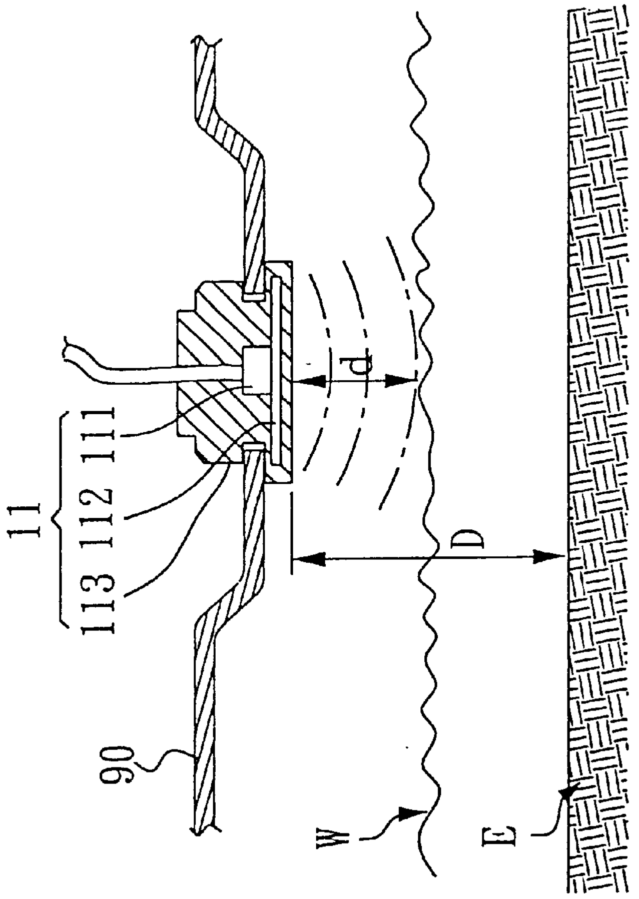
FIG. 2 is a sectional view of an electric field induction type water level sensor for the on-vehicle flood alarm system according to the first embodiment of the present invention.

Referring to FIG. 2, the water level sensor 11 is an electric field induction type water level sensor of substantially flat, circular shape, having an electric field induction IC 111 provided in the inside, a disk-like conducting member, for example, a disk-like copper foil 112 provided at the bottom side (the diameter of the conducting member has concern with the detection distance), and a rubber packing layer 113 covered on the bottom side over the disk-like copper foil 112. When connected with an electrostatic charge, the disk-like copper foil 112 induces a reversed electric charge from the water level W of accumulated water on the ground E below the floor 90 of the motor vehicle 9, thereby causing an electrostatic field to be produced between the disk-like copper foil 112 and the water level W. The electric field induction IC 111 detects the electric intensity ϕ of the electrostatic field.

Figure 3:
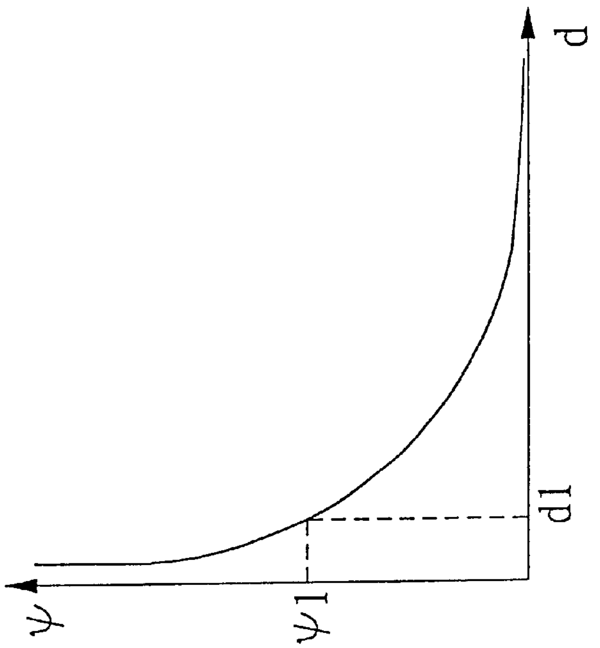
FIG. 3 is an electric intensity-spaced distance curve obtained from the water level sensor of the on-vehicle flood alarm system according to the first embodiment of the present invention.

FIG. 3 shows an electric intensity ϕ-spaced distance d curve obtained from the water level sensor 11 of the on-vehicle flood alarm system according to the first embodiment of the present invention. The spaced distance d is the distance between the water level sensor 11 and the water level W of accumulated water on the ground E below the floor 90 of the motor vehicle 9.

Referring to FIGS. 1~3 again, when the driver parked the motor vehicle 9 and turned off the ignition switch (ACC OFF), the water level sensor 11 is started to detect electric intensity ϕ. According to this embodiment, the water level sensor 11 detects electric intensity ϕ once per every five seconds, i.e., the detection time interval is five seconds. When the value of detected electric intensity ϕ surpassed a predetermined electric intensity $\phi_1$, it means that the spaced distance d between the water level sensor 11 and the water level W of accumulated water on the ground E below the motor vehicle 9 is shorter than a predetermined distance $d_1$, i.e. accumulated water on the ground reaches the alarm level. At this time, the water level sensor 11 outputs a control signal C to the microprocessor 3.

In order to present a false action, the microprocessor 3 is set to drive the alarm device 2 to inform the owner of the motor vehicle 9 only when "continuously" received control signal C more than a predetermined times (for example, ten times) within a predetermined time interval (for example, two minutes). When received control signal C "not continuously", the microprocessor 3 zeroes the reading and starts counting again.

According to this embodiment, the alarm device 2 is a wireless communication device 21, for example, a GSM communication device such as a pager 211 adapted for transmitting a flood short message S to the owner of the motor vehicle 9.

Therefore, when the ignition switch of the motor vehicle 9 turned off, the water level sensor 11 immediately starts to detect the water level W of accumulated water on the ground E below the motor vehicle 9, and drives the GSM communication pager 211 to send a flood short message S to the owner of the motor vehicle 9 when continuously detected the spaced distance $d<d_1$ of the predetermined distance ten times within two minutes. By means of the aforesaid performance, the on-vehicle flood alarm system informs the owner of the motor vehicle 9 to take the necessary action at an early stage, preventing soaking of the motor vehicle 9 in water and reducing the cost of repairing.

Alternatively, the wireless communication device 21 can be an on-vehicle GSM or GPRS mobile telephone, or any other on-vehicle mobile telephone for dialing to the motor vehicle owner's mobile telephone or office/residence telephone to give a flood alarm voice message that is pre-recorded in the memory 22, or dialing to the motor vehicle owner's office/home fax machine to give data of flood alarm message. The wireless communication device 21 can also be a WAP mobile telephone for sending a flood alarm messaging to the motor vehicle owner's E-mail address. The wireless communication device 21 can also be set to dial to a customs service center, requesting the customs service center to inform the owner of the motor vehicle by means of any of the aforesaid wireless communication methods (short message, voice, telephone, fax, E-mail).

Figure 4:
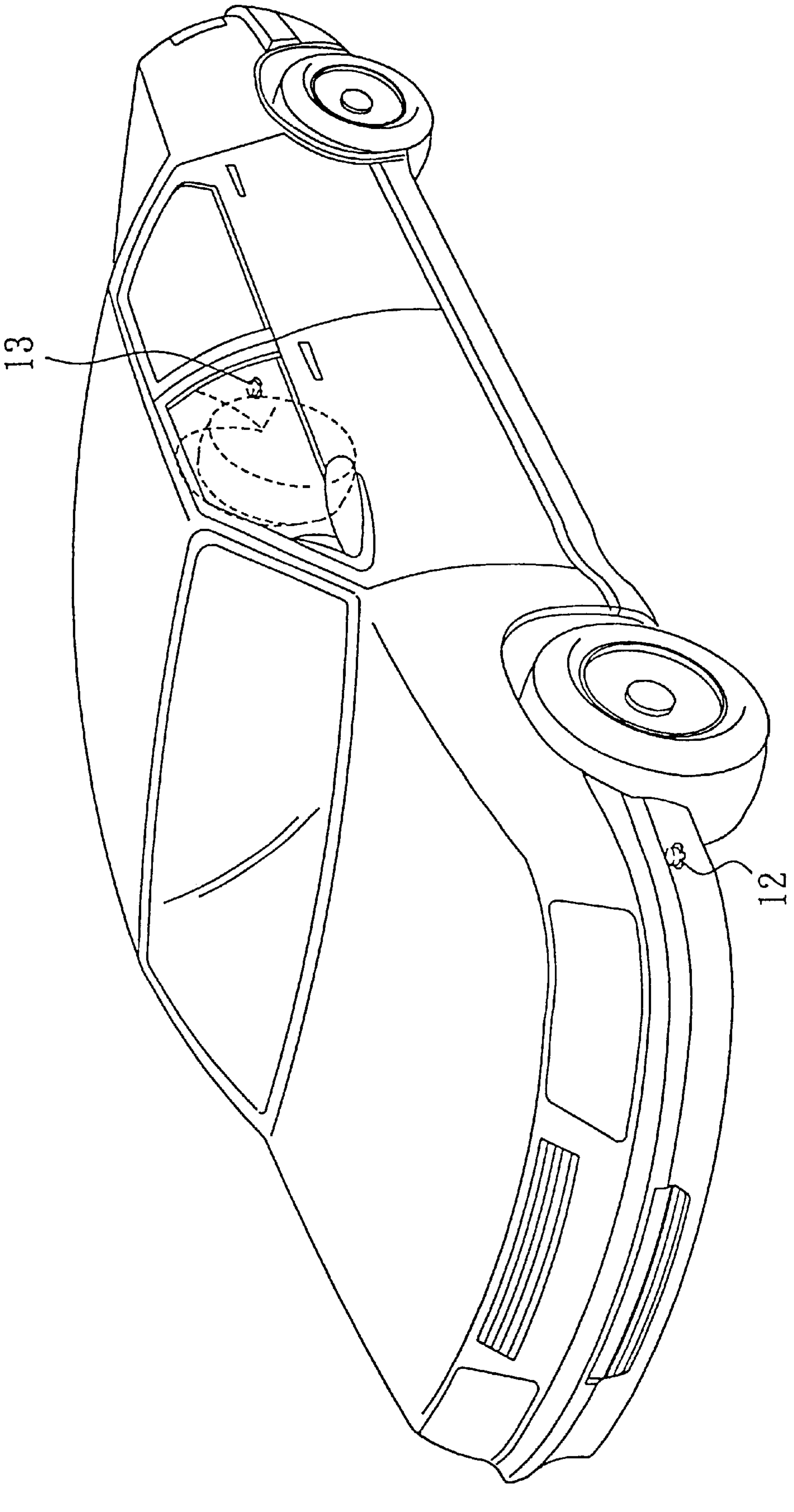
FIG. 4 an installed view of the on-vehicle flood alarm system according to the second embodiment of the present invention.

FIG. 4 shows an alternate form of the present invention. According to this embodiment, a first water level sensor 12 and a second water level sensor 13 are respectively provided in the bottom side of the front bumper and the bottom side of the rear bumper. The data obtained from the first water level sensor 12 and the second water level sensor 13 are calculated through "AND" operation of Boolean Operator, so that the on-vehicle flood alarm system drives the alarm device to give an alarm signal to the owner of the motor vehicle only when accumulated water in the front side and accumulated water in the rear side both reached the pre-set alarm level. This embodiment is most suitable for use in slope parking to judge real accumulation of floodwater.

Although the present invention has been explained in relation to its preferred embodiments, it is to be understood that many other possible modifications and variations can be made without departing from the spirit and scope of the invention as hereinafter claimed.

What is claimed is:

1. An on-vehicle flood alarm system installed in a motor vehicle for detecting flood and giving an alarm signal upon detection of flood, comprising:

at least one water level sensor installed in a bottom side of said motor vehicle and spaced above the ground at a distance, said at least one water level sensor being adapted to detect accumulation water on the ground when the ignition switch of said motor vehicle turned off, and to send out a control signal when the distance between the level of accumulated water on the ground and the respective water level sensor became shorter than a predetermined distance;

an alarm device; and a microprocessor electrically connected to said at least one water level sensor and said alarm device and adapted to receive said control signal from said at least one water level sensor and to further drive said alarm device to send out an alarm signal to inform the owner of said motor vehicle.

2. The on-vehicle flood alarm system as claimed in claim 1, wherein said at least one water level sensor each is an electric field induction type water level sensor adapted for detecting surrounding electric intensity.

3. The on-vehicle flood alarm system as claimed in claim 1, wherein the number of said at least one water level sensor is one, which is installed in the center of the bottom side of the floor of said motor vehicle.

4. The on-vehicle flood alarm system as claimed in claim 1, wherein said alarm device is a wireless communication device adapted for providing a wireless alarm signal.

5. The on-vehicle flood alarm system as claimed in claim 4, said wireless communication device is a GSM communication device adapted for providing a short message of wireless alarm signal.

6. The on-vehicle flood alarm system as claimed in claim 1, wherein said microprocessor drives said alarm device to send out said alarm signal to inform the owner of said motor vehicle when received said control signal a predetermined number of times within a predetermined time interval.

7. The on-vehicle flood alarm system as claimed in claim 6, wherein said predetermined number of times is a continuous series of number of times.

* * * * *